Patented June 22, 1954

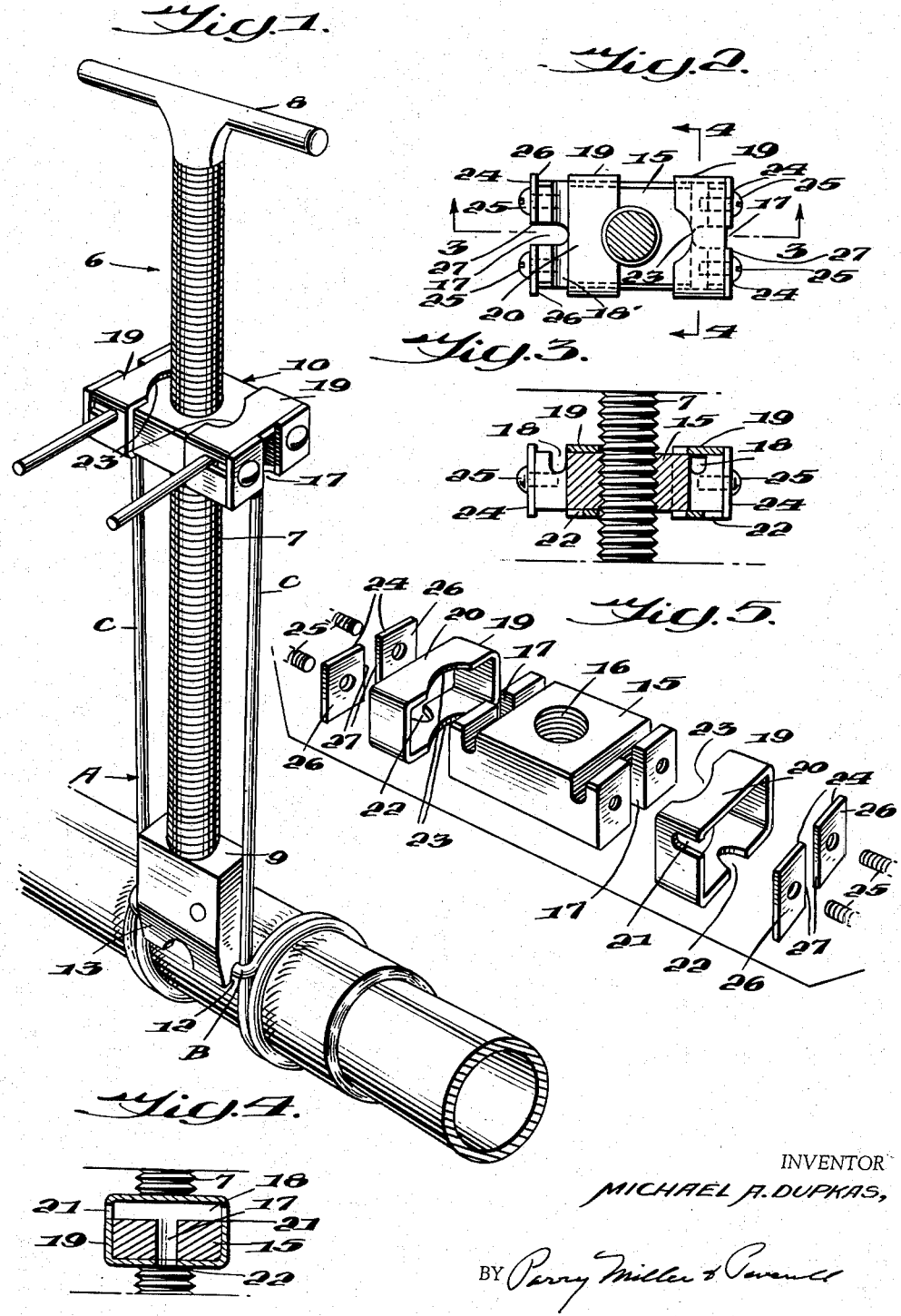

2,681,580

UNITED STATES PATENT OFFICE 2,681,580

TOOL FOR HOSE CLAMPS

Michael A. Dupkas, Cornwall, Pa.

Application June 1, 1951, Serial No. 229,355

7 Claims. (Cl. 81—9.3)

This invention relates to clamping tools, and more particularly to improved wire clamping and retaining means for wire clamping tools of the type designed especially for securing a coupling member to a hose by securely fastening or clamping a wire clamp or loop about the same.

Wire clamps or loops of the type in question usually comprise a piece of wire of suitable dimensions bent into the form of a U to provide a bight or base portion and connecting leg portions. In use such clamps are coiled around a hose one or more times by passing the leg portions through the bight portion, and the coils then tightened by a clamping tool of the general type herein disclosed. When the coils are sufficiently tight to clamp the hose in leak-proof engagement with an inserted bushing or clamping member, the ends of the leg portions are bent back over the bight portion to lock the coils in their tightened positions.

A primary object of the present invention is the provision of an improved clamping tool of simple and economical construction for easily and quickly securing a wire clamp on a hose end to attach the hose in leak-proof relation with an inserted coupling or bushing.

A further object of the invention is the provision of a clamping tool of improved and simplified construction with which a leak-proof connection between a hose and inserted coupling may be effected with a minimum of time and effort.

A still further object of the invention is the provision of an improved wire clamping or holding means particularly designed for use with a wire-clamping tool for attaching wire clamps to hose ends.

These and other objects of the invention will be apparent to persons skilled in the art from a consideration of the drawings and annexed specification illustrating and describing a preferred embodiment of the invention.

In the drawings—

Fig. 1 is a perspective view of the clamping tool as applied in securing a wire loop to a hose end;

Fig. 2 is a top plan view of the wire clamping or holding block shown in Fig. 1;

Fig. 3 is a cross sectional view of the clamping block taken on the line 3—3 of Fig. 2;

Fig. 4 is a cross sectional view of the clamping block taken on the line 4—4 of Fig. 2; and Fig. 5 is an exploded perspective view of the clamping block.

The invention is illustrated as embodied in a clamping tool 6 comprising an elongated threaded shank 7 having at one end thereof a handle 8 and at the other end a presser foot 9. The shank 7 is of sufficient length to permit the desired movement of a clamping means 10 therealong and of a diameter such as to withstand the stresses to which it is subjected when in use.

The handle 8 may be of any suitable type and is preferably a simple cross-member of any desirable cross sectional shape and length welded or otherwise secured to the end of the shank.

The presser foot 9 is rotatably secured on a reduced end portion of the shank 7 and is provided at its end with a transverse groove 12 adapted to receive the bight portion B of a wire clamp A as shown in Fig. 1. The presser foot 9 may desirably be formed as an elongated flattened member substantially rectangular in transverse cross sectional shape and having the opposite side faces thereof bevelled inwardly adjacent the ends thereof, as indicated by reference numeral 13, to facilitate turning movement of the tool about the bight portion B to properly bend the wire, as will appear more clearly hereinafter.

The wire clamp holding or retaining means 10 is mounted on the shank 7 intermediate the handle 8, and the presser foot 9 and comprises a block or nut 15 provided with a screw threaded aperture 16 therein for receiving the shank. It is apparent that when the shank 7 is rotated relative to the block 15, the latter will move therealong in an axial direction dependent on the direction of rotation of the shank.

The block 15 may be of any desired shape to accomplish the purposes of the invention but, as shown, is preferably rectangular in longitudinal and transverse cross section and is provided with oppositely disposed grooves 17 in the ends thereof which extend substantially parallel to the axis of the shank and spaced grooves 18 in the side thereof remote from the presser foot 9 which extend substantially at right angles to the axis of the shank. The grooves 18 are disposed inwardly of the ends of the block member in substantially parallel relation therewith and the grooves 17 extend inwardly from the ends of the block member to a depth such as to intersect the grooves 18. By virtue of this arrangement a pair of angularly related communicating grooves is formed at each end of the block member which open respectively on the ends and side of the block member remote from the presser foot and are adapted to receive angularly disposed portions of the wire clamp leg portions C. While the grooves 18, as shown, extend entirely across the side of the block member 15, it will be realized that this is done primarily to facilitate manufacture and that such grooves need only extend to points where they intersect the grooves 17 in order to carry out the purpose of the invention.

In order to securely clamp and hold the wire leg portions C in the grooves 17 and 18 so as to prevent withdrawal therefrom when a tensioning force is exerted thereon, means are provided for closing the grooves 18 when the wires are positioned therein. In a preferred form of construction such means comprise sleeve members 19 slidably mounted on the block member 15 on opposite sides of the shank member 7 and movable therealong to selectively bring the portions 20 thereof into overlying relation with the grooves.

The sleeve members 19 may desirably be formed by bending or otherwise shaping a strip of metal into rectangular form to loosely embrace the block member 15. The ends of such strip may extend inwardly toward each other just sufficiently to grip the edges of the block member so as to retain the sleeve member in mounted position thereon or, alternatively, may be extended further inwardly and if desired, into abutting relation, and secured together in any suitable manner, as by welding, to form a closed sleeve.

In order to permit the sleeve members 19 to move outwardly on the block member without interference with the ends of the wires extending from the grooves 18, suitable slots 21 may be formed in the outer edges of the sleeves in substantial alignment with the grooves 18. Where necessary, additional slots 22 may also be provided in the sleeve members so as to receive and thus avoid interference with the wires passing into the aperture 17. On their inner edges the sleeve members 19 may desirably be provided with oppositely disposed arcuate shaped cutout portions 23 shaped and arranged to receive portions of the shank member 7 to permit increased movement inwardly of the sleeve members.

To prevent accidental removal of the sleeve members 19 from the ends of the block members 15 stop plates 24 are removably secured thereto as by screws 25. The stop plates 24 are provided with flanged portions 26 on the outer edges thereof which project outwardly beyond the end edges of the block member into the path of the sleeve member, thereby limiting outward movement thereof. The inner edges 27 of the stop plates 24 are made flush with the sides of the grooves 17 to permit ready insertion and removal of the wire leg portion C.

In the use of the device a U-shaped wire clamp A is coiled around a hose by passing the leg portions C thereof through the bight portion B. The leg portions C are then inserted in the grooves 17 and the ends thereof bent laterally into the grooves 18. Sleeves 19 are moved outwardly to close the grooves 18 so as to securely clamp and hold the leg portions C in the block member. Following this, the bight B of the wire clamp is then engaged in the groove 12 of the presser foot 9 and the shank 7 rotated relative to the block member to move the latter along the shank away from the presser foot. This pulls the bight portion B and leg portions C away from each other, thereby drawing the coils of the clamp tightly around the hose. This portion of the operation may be facilitated by alternately rolling the hose toward and away from the handle of the tool with intermediate tightening until the desired degree of tension is obtained. The tool may then be rotated counterclockwise, as viewed in Figure 1, to bend the leg portions C around the bight portion B. This secures the wire clamp in position on the hose, at which point the clamping tool is removed and the ends of the wire leg portions C clipped off to the desired length.

It will thus be seen that the present invention provides an improved and highly effective clamping tool for the intended purpose. While I have illustrated and described a preferred embodiment of the invention, I do not intend to be limited to the specific construction disclosed except as defined in the appended claims.

I claim:

1. In a wire clamp clamping tool, a clamping member comprising a movable block member having communicating grooves opening on adjacent top and end faces thereof for receiving a wire, said grooves being arranged in angular relation to each other to accommodate portions of the wire adjacent a bend therein, and a sleeve member slidably mounted on said block member for movement to overlying relation with the groove in the top face to close the same and retain the wire therein.

2. A tool for clinching wire hose clamps in place on hose ends comprising a shank having a presser foot mounted on one end thereof for engaging an intermediate portion of a wire clamp, a block member longitudinally movable on said shank and having opposed grooves for receiving portions of said wire clamp adjacent the ends thereof, means forming a second pair of grooves opening on the face of said block opposite said presser foot and communicating with said first named grooves and arranged in angular relation therewith for receiving bent portions of said wire clamp ends, and sleeve members slidably mounted on said block member and movable to close said second named grooves to retain the bent portions of said wire clamp ends therein.

3. A tool for clinching wire hose clamps in place on hose ends comprising a threaded shank having a presser foot mounted on one end thereof for engaging an intermediate portion of a wire clamp, an oblong block screw-threadedly engaged with said shank and movable longitudinally thereof, opposed grooves opening on the ends of said block and extending substantially parallel to said shank member for receiving portions of said wire clamp adjacent the ends thereof, other grooves opening on the face of said block opposite said presser foot and communicating with said first named grooves, said other grooves extending transversely of said block in angular relation to said first named grooves for receiving bent end portions of said wire clamp, and sleeve members slidably mounted on said block for movement longitudinally thereof to selectively cover and uncover said other grooves.

4. A tool of the type set forth in claim 3 in which said sleeve members are provided with slots in the edges thereof to receive the bent portions of said wire clamp ends when the sleeve members are moved to cover said other grooves.

5. In a wire clamp clamping tool, a movable clamping block member, a threaded central bore extending through the block member from top face to bottom face thereof and adapted to receive a threaded clamping tool shank, said block member having grooves in the opposite ends thereof extending parallel to and aligned with said threaded central bore, spaced transverse grooves in the top face of the block member separated by said threaded central bore and intersecting said grooves in the opposite end faces, each end face groove and intersecting top face groove being adapted to accommodate portions of a wire adjacent a bend therein, and sleeve members slidably mounted on the block member for movement lengthwise thereof into overlying relation with the top face grooves to close the same for retaining portions of wire therein and for opposite movement lengthwise of the block member to uncover the top face grooves for insertion of portions of wire therein.

6. In a wire clamp clamping tool according to claim 5, wherein the sleeve members have wire receiving slots aligned with the top face grooves.

7. In a wire clamp clamping tool according to claim 5, stop means secured to the block member adapted to limit movement of the sleeve members.

References Cited in the file of this patent

UNITED STATES PATENTS

| Number | Name | Date |
| --- | --- | --- |
| 369,731 | Nutting | Sept. 13, 1887 |
| 1,453,940 | Lowrey | May 1, 1923 |
| 2,279,173 | McCutcheon | Apr. 7, 1942 |
| 2,283,789 | Buckwalter | May 19, 1942 |
| 2,507,723 | Leja | May 16, 1950 |